United States Patent [19]

Fletcher et al.

[11] 4,078,110

[45] Mar. 7, 1978

[54] FLEXIBLE PILE THERMAL BARRIER INSULATOR

[76] Inventors: James C. Fletcher, administrator of the National Aeronautics and Space Administration, with respect to an invention of George Edward Anderson, Lynwood; Donald Maurice Fell, Downey; Jerry Stanley Tesinsky, San Pedro, all of Calif.

[21] Appl. No.: 681,000

[22] Filed: Apr. 28, 1976

[51] Int. Cl.² .............................................. B32B 3/02
[52] U.S. Cl. ................................. 428/93; 49/479; 49/485; 49/DIG. 1; 428/94; 428/95; 428/96; 428/97; 428/913
[58] Field of Search ...................... 428/93, 94, 95, 96, 428/97, 358, 913; 49/477, 479, 483, 485, 486, 493, 503, DIG. 1

[56] References Cited

U.S. PATENT DOCUMENTS

| | | | |
|---|---|---|---|
| 1,931,881 | 10/1933 | Bailey | 428/358 |
| 2,021,972 | 11/1935 | Vogt | 428/93 |
| 2,191,549 | 2/1940 | Spraragen | 428/358 |
| 2,242,128 | 5/1941 | Hornsby | 428/94 |
| 3,764,448 | 10/1973 | Nisbet | 428/94 |

*Primary Examiner*—Marion E. McCamish
*Attorney, Agent, or Firm*—Russell E. Schlorff; John R. Manning; Marvin F. Matthews

[57] ABSTRACT

A flexible pile thermal barrier insulator includes a plurality of upstanding pile yarns. A generally planar backing section supports the upstanding pile yarns. The backing section includes a plurality of filler yarns forming a mesh in a first direction. A plurality of warp yarns are looped around said filler yarns and said pile yarns in said backing section and form a mesh in a second direction. A binder prevents separation of the yarns in the backing section.

7 Claims, 4 Drawing Figures

FLEXIBLE PILE THERMAL BARRIER INSULATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U. S. C. 2457).

BACKGROUND OF THE INVENTION

1. Field of the Invention

The field of art to which the invention pertains includes the field of thermal barrier insulators, particularly, with respect to a insulative structure which can be utilized in a constantly varying gap while maintaining an aerodynamic mold line.

2. Description of the Prior Art

While numerous materials have been utilized to provide thermal barriers between the exterior and interior surface of space vehicles which are subjected to large temperature variations, none of these materials have been found to provide an effective thermal barrier insulator during re-entry where the exterior of the vehicle is subjected to high temperatures, while simultaneously maintaining an aerodynamic mold line. In addition, no insulative material has been found effective along a constantly varying gap due to relative movement between a pair of members of the space vehicle.

Typically such a thermal barrier insulator must provide the following features:

(1) Low thermal conductivity.

(2) High and low temperature capability (minus 470° to 2,300° F with present materials).

(3) Low load compressability.

(4) Ease of movement of the mating surfaces.

(5) Inhibition of plasma flow through the thermal barrier.

SUMMARY OF THE INVENTION

The present invention provides a thermal barrier having insulative qualities which can be installed on a spacecraft at the junction of a movable member and the spacecraft structure, such as a spacecraft door, wherein the door or opening is movable in three planes, while maintaining the aerodynamic mold line of the vehicle. As an example, during re-entry it is necessary that the exterior structural surface temperature of the vehicle does not exceed 350° F while the exterior temperature on the external vehicle insulation can rise to 2,000° F or greater. The present invention maintains the interior temperature of the space vehicle below 350° F, while simultaneously providing a smooth exterior spacecraft surface aerodynamic mold line.

A flexible pile thermal barrier insulator is formed of a plurality of upstanding pile yarns. A generally planar backing section supports the upstanding yarns and includes a plurality of filler yarns forming a mesh in a first direction. A plurality of warp yarns are looped around said filler yarns and said pile yarns in the backing section and form a mesh in a second direction. A binder prevents separation of the yarns in the backing section. Typically, the backing section is secured to a fixed surface and the free ends of the upstanding pile yarns mesh with a member which is movable in a plurality of directions.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
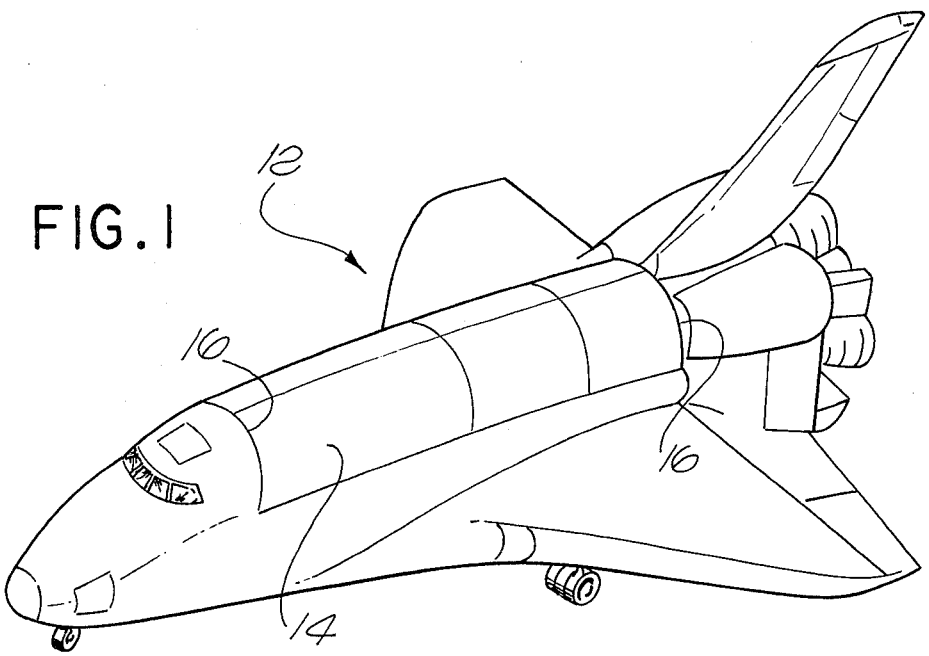
FIG. 1 is a perspective view of a typical spacecraft utilizing the flexible pile thermal barrier insulator of the present invention.

Referring now to the drawings, there is shown in FIG. 1 a typical spacecraft in which the present invention can be utilized. During the re-entry phase of a mission, portions of the exterior surface of the spacecraft are subjected to high heat temperatures. It is necessary to protect the interior of the spacecraft from such high temperatures. Major heat entry problems exist in the spacecraft structures such as doors which normally may be opened during a space flight and thus, form a break in the integrity of the spacecraft outer structure. Typically, the spacecraft 12 of FIG. 1 contains a door 14 which during the spacecraft mission enables astronauts or payloads to enter or exit the spacecraft. The door which normally pivots outwardly, must be sealed around its periphery 16 so that when it is closed during re-entry, high temperatures which are reached on the exterior of the vehicle are not transferred to the interior of the vehicle. It should be understood that while the present invention is described with the spacecraft configuration of FIG. 1, typically a space shuttle type spacecraft, the thermal barrier insulator of the invention could be used in other applications or processes where relative movement between assemblies or parts require a flexible barrier to reduce hot gaseous or liquidous flow.

Figure 2:
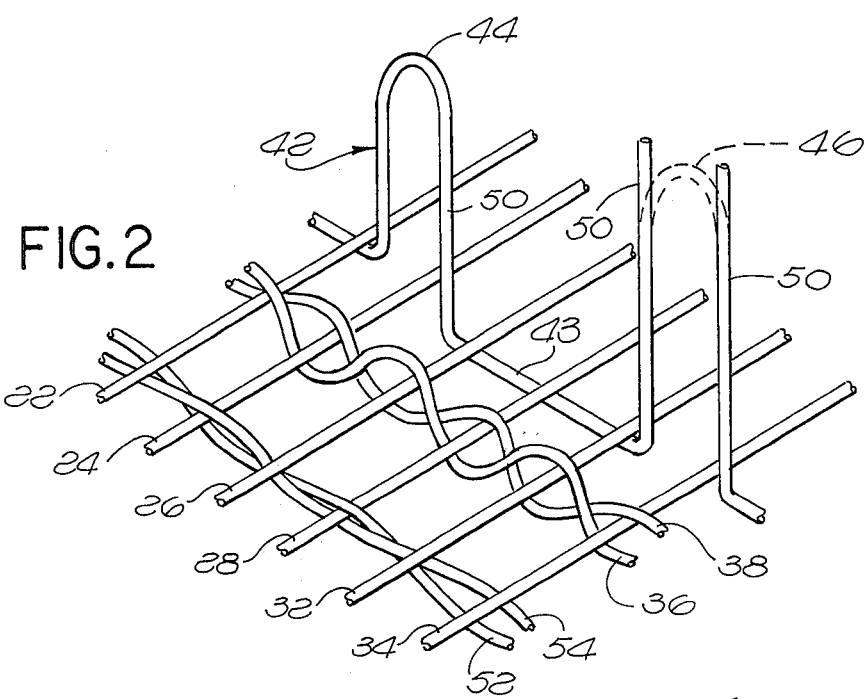
FIG. 2 is an enlarged perspective view of a portion of the flexible pile thermal barrier insulator illustrating the technique for weaving the yarns forming the insulator structure.

Referring now to FIG. 2 there is illustrated a partial perspective view of a portion of the flexible pile thermal barrier insulator and the technique for fabricating the same. Typically, the thermal barrier insulator is formed by a weaving process wherein a plurality of parallel filler yarns illustrated as yarns 22, 24, 26, 28, 32, and 34 are positioned in a first plane. While only six filler yarns are illustrated, it should be understood that as many filler yarns as necessary can be added dependent on the size of the thermal barrier insulator. A plurality of pairs of warp yarns (one pair 36 and 38 which is shown) are arranged so that one yarn of the pair alternately is looped over and under adjacent filler yarns, while the other yarns of the pair alternately loops under and over the adjacent filler yarns, respectively. A pile yarn 42 (one of which is shown) is woven into the filler yarn in planes parallel to the warp yarns 36 and 38. In a normal configuration of weaving, the rows of warp yarns 36 and 38 and pile yarn 42 may be alternately spaced along the axis of the filler yarns. Additionally, as will be explained, stuffers can be added when desired. A satisfactory technique for weaving the pile yarn has been found to be the tripick-U weave. In the tripick-U weave, the pile yarn 42 is initially placed under the first filler yarn 22 and then drawn to a desired height intermediate the filler yarns 22 and 24 in a plane perpendicular to the plane of the filler yarns. When a desired approximate height of the pile yarn has been reached, the pile yarn is then looped over and down so that it passes over the filler yarn 24. A base 43 of the pile yarn 42 then extends beneath the next three filler yarns 26, 28 and 32. The pile yarn then is drawn again up to the approximate desired height and then over the filler yarn 34 and the weave process is again repeated. As illustrated by the yarn loops 44 and 46 in dotted lines, after the weaving process has been completed, the loops 44 and 46 are removed by a process which will be explained hereinafter so that only the free ends of the pile yarn remain, with the backing base 43 interconnecting a pair of adjacent upstanding pile yarn arms 50.

Stuffer yarns may additionally be woven into the pattern and tend to keep the pile yarns in an upstanding position. The stuffer yarns 52 and 54 are woven similarly to the warp yarns 36 and 38 and in a similar parallel plane. However, the stuffer yarns 52 and 54 are only woven above and below alternate filler yarns, such as the filler yarns 24, 28 and 34. The net effect of the stuffer yarns 52 and 54 is to displace alternate filler yarns in the filler yarn plane as will be explained hereinafter and enable the pile yarns to stand up better. The greater the number of stuffer yarns which are added, the greater the standing stiffness of the pile yarns.

Typically, the filler yarns, the warp yarns, the pile yarns and the stuffers are made of either S-glass which is a composition formed of 65% silicon dioxide, 25% aluminum dioxide, and 10% manganese oxide or they are formed of quartz having a composition of 99.9% silicon dioxide. The exact yarn fiber used depends on the temperature to be encountered. S-glass has been found to be effective for exterior temperatures up to 1,400° F and quartz has been found effective for exterior temperatures up to 2,300° F.

Figure 3:
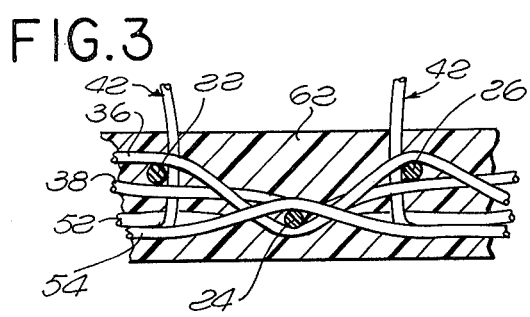
FIG. 3 is a partial cross-sectional view of a portion of the thermal barrier insulator of FIG. 2 illustrating the formation of the backing section thereof.

After the weaving process is complete, a binder 62 of silicone rubber can be sprayed or applied by other conventional means in the area adjacent the warp yarns 36 and 38, the filler yarns 22, 24, 26, 28, 32, and 34, the stuffers 52 and 54, and the adjacent portion of pile yarns to form an integral backing section. As shown in FIG. 3 the binder 62 prevents separation of the yarns. Once the binder 62 has set, the upwardly extending ends of the pile yarns 42 are cut severing the loops 44 and 46. Should it be desired to have a tapered pattern of the free ends of the pile yarns 42, the cutting can be done by machining of the upstanding pile yarns 42.

In the weaving process, it has been found that twisting of the filler yarns, the warp yarns, and the stuffer yarns at a varying twist of between two to ten twists per inch enables the yarn fibers to be held together better. However, normally the pile yarns are not twisted so that a desired softness and standing is provided in the pile yarns. Further as can be seen in FIG. 3, the use of stuffers vertically displaces alternate filler yarns which in turn lends support to the pile yarns enabling the pile yarns to stand up. The amount of vertical integrity of the pile yarns is determined by the number of rows of stuffers which are added to the weaving pattern.

The pile density excluding the backing will vary from 9.5 pounds per cubic foot to a maximum of 27 pounds per cubic foot with the former weight including a larger number of stuffer yarns in the backing. The total weight of the yarns in the backing varies from a heavy density of 0.8 grams per square inch to a light density of 1.0 grams per square inch, the lighter density requiring additional stuffers which adds weight to the backing. Normally the pile height, i.e. the height of the pile yarns from the backing, can vary from one fifth of an inch to four inches dependent upon the requirements of the thermal barrier insulator.

Figure 4:
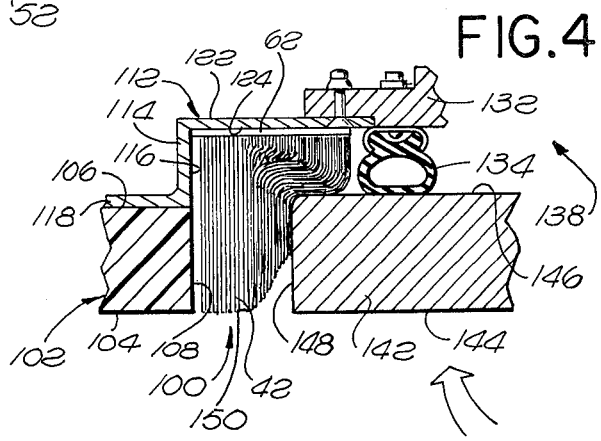
FIG. 4 is a cross-sectional view of a portion of a spacecraft illustrating the mounting of the thermal barrier insulator.

Referring now to FIG. 4 there is shown a typical installation of the completed thermal barrier insulator 100 in a portion of the structure such as the spacecraft of FIG. 1. A fixed insulator member 102 contains an exterior surface 104 and an interior surface 106 and terminates at an end surface 108 interconnecting the parallel exterior and interior surfaces 104 and 106. A generally Z-shaped mating plate 112 is formed of a central section 114 whose exterior surface 116 extends parallel to the fixed insulator member end surface 108 and forms a continuation thereof and a pair of flanges 118 and 122 extending in opposite directions from each end of the central sections 114, respectively. The flange 118 is secured to the interior surface 106 of the fixed insulator member 102. The flange 122 exterior surface 124 forms a mounting surface for the thermal barrier insulator 100 binder 62. The binder 62 is bonded to the exterior surface 124 of the flange 122 by means of a silicone rubber bond using vacuum bags. One end of the thermal barrier insulator 100 is adjacent the surfaces 116 and 108 with the pile yarns 42 positioned parallel thereto.

An L-shaped mounting bracket 132 has a portion of one side riveted to the flange 122. An environmental seal 134 is secured to the bracket 132 adjacent the other side of the thermal barrier insulator 100. The interior 138 of the spacecraft is sealed from the outer environment by means of a door 142. The door 142, when closed, has an exterior surface 144 which is generally parallel to the fixed insulator member exterior surface 104 and an interior surface 146. The edge 148 of the door is generally parallel to the structural plate surface 108 and the pile yarn fibers 42 when the door is closed.

When the door is closed in the direction of the arrow in FIG. 4, a portion of the fibres adjacent the environmental seal 134 is compressed. However, the interior surface of the door 146 in the closed position is spaced from the binder 62 of the thermal barrier insulator 100. In addition, the door interior surface 146 abuts the environmental seal 134. Compression of the pile yarns adjacent the door edge 148 occurs. However, a substantial majority of the pile yarn free ends 150 remain parallel with the structure surface 104 and the door exterior surface 144 and form a thermal sealing surface conforming to the theoretical mold line defined by the fixed insulator exterior surface 104 and the door exterior surface 144. The door 142 normally moves in all three planes. However, the pile yarns 42 allow compression and expansion to occur with good recovery thereof enabling an aerodynamic surface to be generally continuously formed along the exterior edge of the spacecraft defined by the fixed insulator member exterior surface 104, the pile yarn free ends 150 and the door exterior surface 144.

We claim:

1. A flexible pile thermal barrier insulator formed of material having high temperature capability comprising:

a plurality of upstanding pile yarns having free ends;

a backing section for supporting said upstanding yarns comprising:

a plurality of filler yarns forming a mesh in the first detection, said pile yarns being formed of a plurality of U-shaped loops having a pair of upstanding arms extending from said backing section to said free ends and a base interconnecting said arms within said backing section, said base extending perpendicular to said filler yarns for a distance greater than three filler yarns to form a woven pattern;

a plurality of warp yarns looped around said filler yarns in said backing section and forming a mesh in a second direction;

a plurality of stuffer yarns looped adjacent alternate filler yarns for displacing said alternate filler yarns in a vertical direction and enabling said pile yarns to maintain a vertical integrity; and binder means for preventing separation of said yarns of said backing section.

2. A flexible pile thermal barrier insulator in accordance with claim 1 wherein said binder means includes a silicone rubber base.

3. A flexible pile thermal barrier insulator in accordance with claim 1 wherein said pile yarns extend upwardly from said backing section in planes perpendicular to said backing section.

4. A flexible pile thermal barrier insulator in accordance with claim 1 wherein said yarns are formed primarily of silicon dioxide.

5. A flexible pile thermal barrier in accordance with claim 4 wherein said yarns include aluminum dioxide and manganese oxide.

6. A flexible pile thermal barrier insulator in accordance with claim 3 wherein said pile yarn portions extend upwardly in a generally non-twisted configuration for enabling said pile yarns to provide a thermal sealing surface along a mold line when subject to compression forces.

7. A flexible pile thermal barrier in accordance with claim 1 for a longitudinally extending gap of varying distance between a stationary portion and a moveable portion of a space vehicle, said barrier maintaining the aerodynamic mold line of the space vehicle and providing thermal protection for the interior portion of the gap; said barrier comprising a backing section attached to the stationary portion and a plurality of rows of upstanding pile yarns having their free ends formed in a plane parallel to said backing section and conforming to the aerodynamic mold line of the space vehicle, the pile yarn being formed of a material having high temperature capability of at least 1400° F, the moveable portion contacting and compressing at least some of the upstanding pile yarns to form a thermal barrier.

* * * * *